United States Patent
Ishitoya et al.

(10) Patent No.: US 9,803,594 B2
(45) Date of Patent: Oct. 31, 2017

(54) FUEL SUPPLY DEVICE

(71) Applicant: Kyosan Denki Co., Ltd., Koga, Ibaraki-pref. (JP)

(72) Inventors: Akihiro Ishitoya, Koga (JP); Akihiro Kimura, Koga (JP); Akinari Sugiyama, Koga (JP)

(73) Assignee: Kyosan Denki Co., Ltd., Koga, Ibaraki-Pref. (JP)

( * ) Notice: Subject to any disclaimer, the term of this patent is extended or adjusted under 35 U.S.C. 154(b) by 81 days.

(21) Appl. No.: 15/019,079

(22) Filed: Feb. 9, 2016

(65) Prior Publication Data
US 2016/0238172 A1    Aug. 18, 2016

(30) Foreign Application Priority Data

Feb. 17, 2015    (JP) .................................. 2015-28918

(51) Int. Cl.
| | |
|---|---|
| F02M 25/08 | (2006.01) |
| F02M 37/10 | (2006.01) |
| F02M 37/20 | (2006.01) |
| F02M 37/00 | (2006.01) |
| F02M 37/22 | (2006.01) |

(52) U.S. Cl.
CPC ...... *F02M 25/0836* (2013.01); *F02M 37/106* (2013.01); *F02M 37/20* (2013.01); *F02M 37/0094* (2013.01); *F02M 2025/0845* (2013.01); *F02M 2037/228* (2013.01); *F16L 2201/10* (2013.01)

(58) Field of Classification Search
CPC .. F02M 25/0836; F02M 37/20; F02M 37/106; F16L 2201/10
USPC ........................................................ 285/93
See application file for complete search history.

(56) References Cited

U.S. PATENT DOCUMENTS

| | | | |
|---|---|---|---|
| 5,392,804 A | 2/1995 | Kondo et al. | |
| 5,924,746 A * | 7/1999 | Fixemer | F16L 37/0987 285/319 |
| 6,616,195 B2 * | 9/2003 | Imaeda | F16L 37/0985 285/305 |
| 2002/0053567 A1 * | 5/2002 | Beyer | B60K 15/00 220/4.14 |
| 2008/0251134 A1 | 10/2008 | Miura | |

(Continued)

FOREIGN PATENT DOCUMENTS

| | | |
|---|---|---|
| JP | 2008-248913 A | 10/2008 |
| JP | 2012-163043 A | 8/2012 |

(Continued)

OTHER PUBLICATIONS

U.S. Appl. No. 15/019,126, filed Feb. 9, 2016, Ishitoya et al.

*Primary Examiner* — James M Hewitt
(74) *Attorney, Agent, or Firm* — Harness, Dickey & Pierce, P.L.C.

(57) ABSTRACT

The fuel supply device has a module installed in a fuel tank. The module has a cap and a support pillar arranged between the cap and a bottom of the fuel tank. The cap is supporting a valve relevant to ventilation of the fuel tank. The valve is supported by a base portion. The base portion and a large diameter part are connected by snap-fit mechanisms. The valve and the base portion are connected by snap-fit mechanisms. A hook part is arranged in an engaging window. It is possible to inspect the valve through the engaging window.

8 Claims, 2 Drawing Sheets

(56) References Cited

U.S. PATENT DOCUMENTS

| | | | |
|---|---|---|---|
| 2010/0192922 A1* | 8/2010 | Masuda | F02M 37/106 |
| | | | 123/509 |
| 2012/0024853 A1 | 2/2012 | Kuwayama et al. | |
| 2012/0024868 A1 | 2/2012 | Menke | |
| 2012/0181293 A1 | 7/2012 | Rinke et al. | |
| 2013/0075394 A1 | 3/2013 | Suzuki | |
| 2014/0001743 A1* | 1/2014 | Keren | F16L 33/225 |
| | | | 285/5 |

FOREIGN PATENT DOCUMENTS

| | | |
|---|---|---|
| JP | 2013-029051 A | 2/2013 |
| JP | 2013-082427 A | 5/2013 |
| JP | 2014-141894 A | 8/2014 |

\* cited by examiner

FUEL SUPPLY DEVICE

CROSS REFERENCE TO RELATED APPLICATION

This application is based on Japanese Patent Application No. 2015-28918 filed on Feb. 17, 2015, the disclosure of which is incorporated herein by reference.

TECHNICAL FIELD

The disclosure in this description relates to a fuel supply device applied to a fuel tank for storing liquid fuel.

BACKGROUND

Patent Literature 1 discloses a fuel supply device. In this device, a fuel tank has an opening and a cap for covering the opening. The cap is used in order to install a component in the fuel tank, and a pillar-shaped member is installed between the cap and a bottom. Patent Literature 2 and Patent Literature 3 disclose examples of the component which should be installed in the fuel tank. Patent Literature 4 and Patent Literature 5 disclose snap-fit mechanisms in the fuel supply device. The content of Patent Literatures listed as prior art are used and incorporated by reference as description for technical components disclosed in this description.

CITATION LIST

Patent Literatures

Patent Literature 1: JP2013-29051A
Patent Literature 2: JP2013-082427A
Patent Literature 3: JP2008-248913A
Patent Literature 4: JP2012-163043A
Patent Literature 5: JP2014-141894A

SUMMARY

In the conventional devices, various components are supported by the cap. However, the component may be hidden by a support member. In this case, it becomes difficult to inspect the existence of the component and an installing condition of the component. In the above viewpoint, or in the other viewpoint not mentioned above, further improvement of a fuel supply device is still demanded.

It is one of objects of disclosure to provide a fuel supply device which allows easy inspection of component.

It is another one of objects of disclosure to provide a fuel supply device in which a snap-fit mechanism for connecting support members can be used to inspect component.

The present disclosure employs the following technical means, in order to attain the above-mentioned object.

The disclosure provides a fuel supply device. The fuel supply device comprises a cylindrical base portion which is disposed in a fuel tank, and defines an component container for containing a component; a large diameter part connected to an outside of the base portion; an inside snap-fit mechanism which connects the component and the base portion by an engagement of a first engaging window disposed on the base portion and a first hook part disposed on the component; and an outside snap-fit mechanism which connects the base portion and the large diameter part by an engagement of a second engaging window and a second hook part, second the engaging window being disposed by penetrating the large diameter part located on a radial outside of the inside snap-fit mechanism in a radial direction, and the second hook part being disposed on the outside of the base portion.

According to this fuel supply device, the inside snap-fit mechanism is positioned within the second engaging window for the outside snap-fit mechanism. Accordingly, it is possible to inspect the inside snap-fit mechanism and the component to be connected there through the second engaging window of the outside snap-fit mechanism.

The above and other objects, features and advantages of the present disclosure will become more apparent from the following detailed description made with reference to the accompanying drawings.

DETAILED DESCRIPTION

Figure 1:
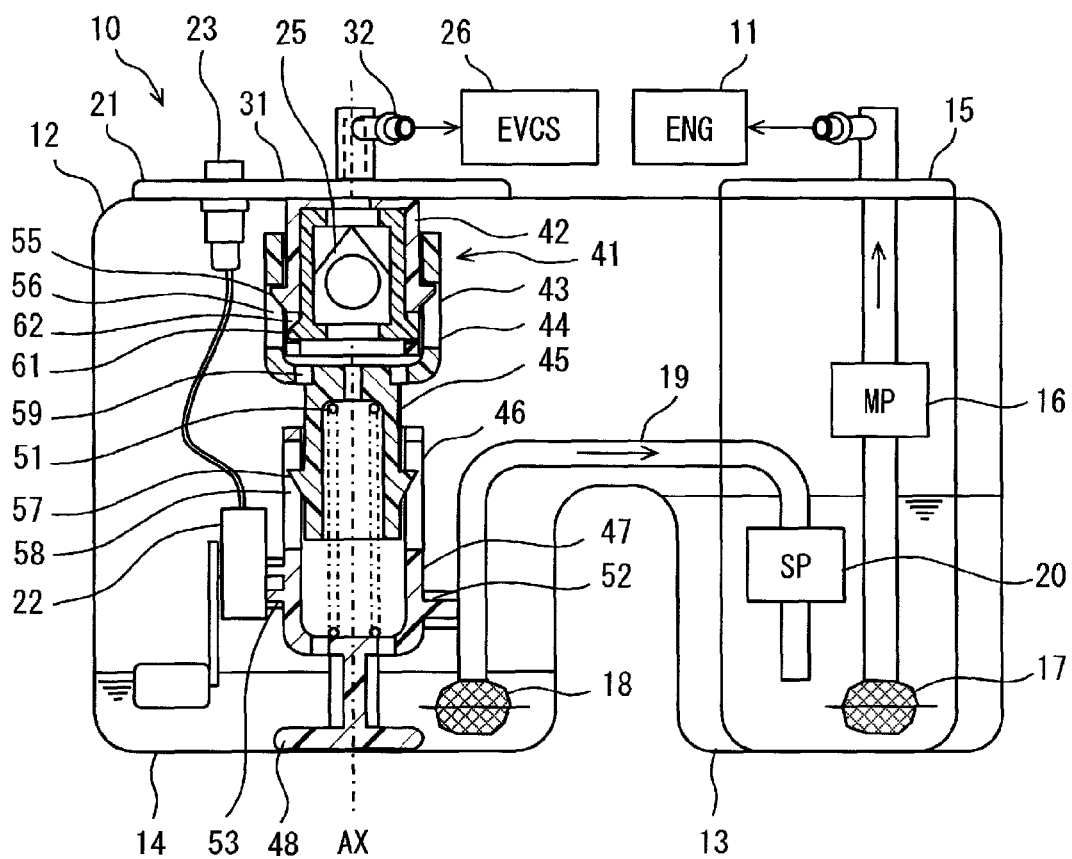
FIG. 1 is a cross-sectional view of a fuel supply device according to a first embodiment.

A plurality of embodiments is described referring to the drawings. In the embodiments, the same parts and components as those in each embodiment are indicated with the same reference numbers and the same descriptions will not be reiterated. In a consecutive embodiment, a correspondence is shown by using a similar reference symbol in which only hundred and more digits differ to indicate a part corresponding to a matter described in the previous embodiment, and the same description may not be repeated. The preceding description may be referred to for the part associated by the reference symbol. In a case that only a part of component or part is described, other descriptions for the other embodiment may be referenced or incorporated as descriptions for the remaining part of component or part.

First Embodiment

In FIG. 1, a fuel supply device 10 is mounted on a road motor vehicle. The fuel supply device 10 supplies a fuel to an internal combustion engine (ENG) 11 as a power source of the vehicle. The fuel supply system 10 has a fuel tank 12 for storing a fuel. The fuel tank 12 is so called a saddle type tank. The fuel tank 12 has a plurality of container sections on which a fuel accumulated. The fuel tank 12 has a first section 13 as main container section and a second section 14 as a sub container section at least.

The fuel supply device 10 has a plurality of tank modules for supporting a component which should be disposed in the fuel tank 12. In this embodiment, the first module 15 and the second module 21 are disposed in the fuel tank 12. Since the first module 15 supports a fuel pump, it may be called a main module or a pump module. Since the second module 21 supports a component for ventilation of the fuel tank 12, it may be called a sub-module or a ventilation module. Since the second module 21 supports an in-tank component for the second section 14, it may be called an additional module or a supplemental module.

The first module 15 pumps up a fuel from the fuel tank 12, and supplies it to the internal combustion engine 11. The first module 15 is disposed on the first section 13. The first module 15 has a main pump (MP) 16 driven by an electric motor. The first module 15 has a suction filter 17 disposed in the first section 13. The main pump 16 sucks a fuel from the suction filter 17. As a result, the main pump 16 supplies the fuel in the first section 13 to the internal combustion engine 11.

The first module 15 has an inter-section transport device for transporting the fuel in the second section 14 to the first section 13. The inter-section transport device is provided by a suction filter 18 disposed in the second section 14, a communicating passage 19 which communicates the second section 14 and the first section 13, and an auxiliary pump 20. The auxiliary pump 20 is disposed in the communicating passage 19, and transports the fuel in the second section 14 to the first section 13 through the communicating passage 19. The auxiliary pump 20 can be provided by a jet pump which uses the fuel pressurized by the main pump 16 as a power source, or a pump driven by an electric motor. For example, the auxiliary pump 20 is a jet pump which uses an excessive fuel returned to the fuel tank 12 from the internal combustion engine 11 as a power source.

The second module 21 is disposed on the second section 14. The second module 21 supports at least one in-tank component. The second module 21 supports the suction filter 18 and the communicating passage 19 as in-tank components. The second module 21 supports a level sensor 22 as an in-tank component. The level sensor 22 is a residual quantity sensor for measuring the fuel quantity which remains in the second section 14. The second module 21 supports an electric connector 23 for outputting electrical signal which indicates the fuel quantity detected by the level sensor 22.

The second module 21 supports component relevant to ventilation of the fuel tank 12. The second module 21 supports a valve 25 relevant to ventilation of the fuel tank 12. The valve 25 is a part of an evaporated fuel emission control system (EVCS) 26 The valve 25 controls communicating condition between an inside of the fuel tank 12 and EVCS 26. In the drawing, the valve 25 is illustrated as a symbol. The valve 25 controls discharge of gas from the fuel tank 12 in response to a height of the fuel level in the fuel tank 12. The valve 25 is a fueling control valve which contributes to adjust a fueling rate by controlling discharge of gas from the fuel tank 12 to EVCS 26. An example of the valve 25 is a float valve.

The valve 25 may be provided by the valves disclosed in JP2013-082427A or JP2008-248913. The content of the above listed documents are incorporated herein by reference as description for technical components disclosed in this description. The valve 25 may be provided by various valves, such as a rollover valve or an electromagnetic valve. The valve 25 may also be called as an EVCS valve, a fuel shut-off valve, or a ventilation valve.

The second module 21 has a cap 31 which covers the opening of the fuel tank 12. The cap 31 is made of resin. The cap 31 has a connecting pipe 32 for ventilation of the fuel tank 12. The inside of the fuel tank 12 is connected to EVCS 26 via the connecting pipe 32.

The second module 21 has a support pillar 41 arranged between the cap 31 and the bottom of the fuel tank 12. The support pillar 41 is a support mechanism which supports the component which should be installed in the fuel tank 12 by using the bottom of the fuel tank 12 as an installing base position for determining a proper position. The support pillar 41 is also a support mechanism for supporting the valve 25. The support pillar 41 is made of resin. The support pillar 41 has a telescopic mechanism in order to be adapted for an error of distance between the cap 31 and the bottom of the fuel tank 12. The telescopic mechanism is capable of extending and contracting about a height direction, and demonstrating a predetermined urging force in an extending direction. The support pillar 41 may be called a stay or a holder tower for the in-tank component.

The support pillar 41 has a base portion 42 which extends from the cap 31. The base portion 42 is a member formed in a cylindrical shape. The base portion 42 may be called a first cylindrical member. The base portion 42 is formed integrally with the cap 31 by a continuous material. The base portion 42 is also a support member which contains the valve 25 and supports the valve 25.

The support pillar 41 has an intermediate portion 43 which extends along the longitudinal direction of the support pillar 41. The intermediate portion 43 is a member formed in a cylindrical shape. The intermediate portion 43 may be called a second cylindrical member. The intermediate portion 43 is connected with the base portion 42 at one end, i.e., an upper end in the drawing. The intermediate portion 43 is connected with the below-mentioned distal end portion 46 at the other end, i.e., a lower end in the drawing.

The intermediate portion 43 has a large diameter part 44 to be connected with the base portion 42, and a small diameter part 45 to be connected with the distal end portion 46. The small diameter part 45 is formed in a cylindrical shape. The large diameter part 44 is formed in a cylindrical shape. The large diameter part 44 is formed to have a diameter larger than the base portion 42. The large diameter part 44 is placed to cover on an outside of the base portion 42. The large diameter part 44 and the base portion 42 are connected in an immovable manner in the axial direction. The large diameter part 44 is formed in a shape which may be called a cylindrical shape with a bottom or a cup. The large diameter part 44 is arranged to cover the base portion 42 and the valve 25 arranged there.

The support pillar 41 has the distal end portion 46. The distal end portion 46 is positioned to contact on the bottom of the fuel tank 12. The distal end portion 46 may be called a bottom portion. The distal end portion 46 has a connecting part 47 formed in a cylindrical shape and a leg portion 48 to be in contact with the bottom of the fuel tank 12. The distal end portion 46 may be called a third cylindrical member. The connecting part 47 is formed to have a diameter larger than the small diameter part 45. The connecting part 47 is placed to cover on an outside of the small diameter part 45. The small diameter part 45 and the connecting part 47 are connected in a movable manner in the axial direction. The small diameter part 45 and the connecting part 47 provide the telescopic device. The small diameter part 45 provides an inner tube for the telescopic device. The connecting part 47 provides an outer tube for the telescopic device. The connecting part 47 is formed in a shape which may be called a cylindrical shape with a bottom or a cup.

A compression spring 51 is accommodated between the intermediate portion 43 and the distal end portion 46. The compression spring 51 urges the intermediate portion 43 and the distal end portion 46 in an extending direction. Thereby, the support pillar 41 is fixedly arranged between the cap 31 and the bottom of the fuel tank 12.

The support pillar 41 has a support part 52 for supporting the inter-section transport device. The support part 52 is disposed on a distal end portion 46. The support part 52 positions the suction filter 18 on the bottom of the second section 14 by supporting the communicating passage 19. Since the suction filter 18 is disposed on an end opening of the communicating passage 19, the support part 52 positions the end opening of the communicating passage 19 on the bottom of the second section 14.

The support pillar 41 has a support part 53 for supporting the level sensor 22. The support part 53 is disposed on the distal end portion 46. The support part 53 positions the level sensor 22 on a regular height which is defined by using the bottom of the fuel tank 12 and a base position.

A snap-fit mechanism is disposed to connect the base portion 42 and the intermediate portion 43. The snap-fit mechanism connects them by using the elasticity of resin. The snap-fit mechanism is provided by a hook part and an engaging window which receives the hook part. As shown in the drawing, the hook part 55 is disposed on an outer surface of the base portion 42. The engaging window 56 is disposed on a cylindrical surface of the large diameter part 44 on the intermediate portion 43. The engaging window 56 is formed on a circumferential area corresponding to the hook part 55. The engaging window 56 receives the hook part 55 and engages with the hook part 55 at a regular axial position.

A snap-fit mechanism is disposed to connect the intermediate portion 43 and the distal end portion 46. As shown in the drawing, a hook part 57 is disposed on an outer surface of the small diameter part 45 of the intermediate portion 43. The engaging window 58 is disposed on the connecting part 47 of the distal end portion 46. The engaging window 58 is formed on a circumferential area corresponding to the hook part 57. The engaging window 58 is formed in a long shape in the axial direction to receive the hook part 57 and to allow a movement of the hook part 57 in the axial direction within a predetermined range. Thereby, it is possible to prevent a relative rotation while permitting a relative displacement in the axial direction between the intermediate portion 43 and the distal end portion 46.

Since the large diameter part 44 is placed to cover the base portion 42, the large diameter part 44 works as a member which protects the valve 25. The large diameter part 44 works to adjust an amount of liquid fuel which reaches directly to the valve 25 in the fuel tank 12. The large diameter part 44 has a plurality of through holes 59 which permit that gas component and liquid component in the fuel tank 12 reach to the valve 25. On the other hand, these through holes 59 are arranged to restrict reaching of liquid component to the valve 25, and to facilitate discharging of liquid component from the valve 25. In this embodiment, the engaging window 56 also works as one of the through holes 59.

The valve 25 and the base portion 42 are connected by a snap-fit mechanism. The valve 25 has a hook part 61 on an outer surface. The base portion 42 has an engaging window 62 on a circumferential area corresponding to the hook part 61. The engaging window 62 is formed to be engaged with the hook part 61 in a condition where the valve 25 is positioned in a regular position.

According to this embodiment, the component container for containing the component relevant to ventilation of the fuel tank 12, i.e., the valve 25 is defined by the base portion 42. The component container is disposed in the base portion 42. The component container is arranged to overlap with the support pillar 41 with respect to the height direction of the support pillar 41. The component container is arranged between the telescopic device of the support pillar 41 and the cap 31.

Figure 2:
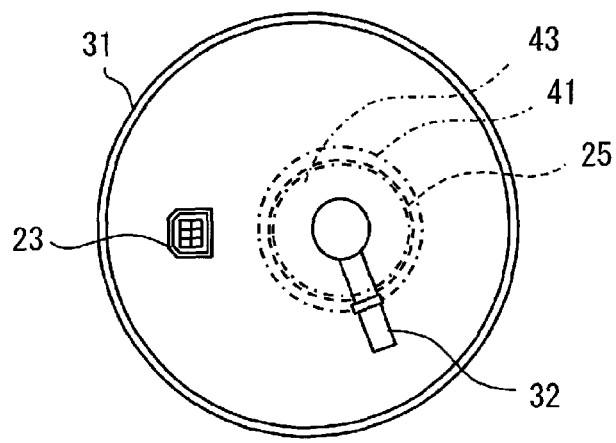
FIG. 2 is a plan view of a cap according to the first embodiment.

In FIG. 2, a plan view viewing the cap 31 from above is illustrated. An axis AX in a movable direction of the valve 25, i.e., the up and down direction, and an axis in the longitudinal direction of the support pillar 41, i.e., an axis AX of the telescopic device are arranged in a coaxial manner. The valve 25 is contained in an inside of the support pillar 41. In this structure, an area occupied by the valve 25 and an area occupied by the support pillar 41 overlap with respect to a projected area in the axial direction. One area and the other area are in a relationship in which one area includes the other one area.

According to this structure, a plurality of components 18, 19, 22, 23, and 25 can be installed within the small cap 31. The suction filter 18, the communicating passage 19 and the level sensor 22 are installed on the cap 31. The suction filter 18, the communicating passage 19 and the level sensor 22 are components which should be installed by using the bottom of the fuel tank 12 as a base point for defining proper positions. The valve 25 as a component relevant to ventilation of the fuel tank 12 is also installed on the cap 31. The valve 25 is positioned within the support pillar 41. The valve 25 and the support pillar 41 are arranged to overlap each other along the height direction.

Figure 3:
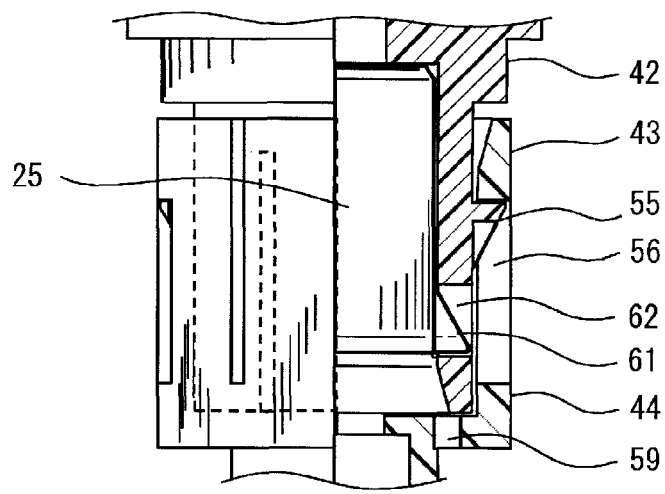
FIG. 3 is a cross-sectional view of a component container according to the first embodiment.

FIG. 3 is a partial cross-sectional view showing the detail of the component container. The base portion 42 has a cylindrical section which contains the valve 25 therein. The large diameter part 44 is arranged to receive an open end of the base portion 42 into an annular cavity part which is formed in an inside of the large diameter part 44. Thereby, it is possible to reduce a width of the open end of the base portion 42 in a radial outside direction.

The valve 25 and the base portion 42 are connected by the snap-fit mechanism 61 and 62, i.e., an inside snap-fit mechanism. The inside snap-fit mechanism connects the valve 25 and the base portion 42 by an engagement of the first engaging window 62 disposed on the base portion 42 and a first hook part 61 disposed on the valve 25. The base portion 42 and the large diameter part 44 are connected by the snap-fit mechanism 55 and 56, i.e., an outside snap-fit mechanism. The outside snap-fit mechanism connects the base portion 42 and the large diameter part 44 by an engagement of a second engaging window 56 and a second hook part 55 disposed on the outside of the base portion 42. The second engaging window 56 is disposed by penetrating the large diameter part 44 located on a radial outside of the inside snap-fit mechanism in a radial direction.

The hook part 55 is formed on the base portion 42. The hook part 55 is formed in a wedge shape to may make it possible to insert the base portion 42 into the large diameter part 44. The engaging window 56 is formed on the large diameter part 44. An inner tapered surface for receiving the base portion 42 is disposed on the open end of the large diameter part 44. The engaging window 56 disposed on the large diameter part 44 is an aperture which penetrates the large diameter part 44 in the radial direction. The support pillar 41 has two or more sets of hook parts 55 and the engaging windows 56. The plurality of sets are arranged at equal intervals along the circumferential direction. For example, the support pillar 41 may have 2 sets or 3 sets of the hook parts 55 and the engaging windows 56.

The valve 25 has a cylindrical shape. In the drawing, an appearance of a resin made case the valve 25 is illustrated. The valve 25 is contained in the component container which is defined within the base portion 42. An inner tapered surface for receiving the valve 25 is disposed on the open end of the base portion 42. The hook part 61 is formed in a wedge shape to make it possible to insert the valve 25 into the base portion 42. The engaging window 62 is an aperture which penetrates the base portion 42 in the radial direction.

The large diameter part 44 is divided into a plurality of arcuate parts in order to enable elastic deformation for receiving the base portion 42. The base portion 42 is divided into a plurality of arcuate parts in order to enable elastic deformation for receiving the valve 25. A plurality of slits divide the large diameter part 44 into a plurality of arcuate parts. A plurality of slits divide the base portion 42 into a plurality of arcuate parts. The slits on the large diameter part 44 and the slits on the base portion 42 are arranged each other in a circumferentially shifted manner in order to be not in a series relation in the radial direction when the base portion 42 and the large diameter part 44 are connected. Thereby, excessive communication between the component container and the exterior is avoided.

The hook part 61 and the engaging window 62 are disposed on a positional area corresponding to the engaging window 56. The hook part 61 and the engaging window 62 are disposed to be located on a radial inside of the engaging window 56. On the base portion 42, the hook part 55 and the engaging window 62 are arranged along an axial direction of the base portion 42, i.e., a height direction. The hook part 55 and the engaging window 62 are disposed adjacently in the axial direction. The engaging window 62 is arranged closer to an open end of the base portion 42 than the hook part 55. Since the hook part 55 and the engaging window 62 are arranged on a straight line, the hook part 55 and the engaging window 62 are positioned within the single engaging window 56.

The engaging window 56 is an aperture which has a width capable of receiving the hook part 55, and which is long and narrow along the axial direction and spreads over an area extended from the hook part 55 to at least a part of the engaging window 62. The engaging window 56 spreads over both the hook part 55 and the engaging window 62. The engaging window 56 has a shape and area which overlap with at least a part of the hook part 61. The hook part 55, the engaging window 62, and the hook part 61 are positioned within the engaging window 56 in a visible manner.

The valve 25 is inserted into the component container formed in the base portion 42 from the open end of the base portion 42. The large diameter part 44 of the intermediate portion 43 is also placed to cover the outside of the base portion 42 from the open end of the base portion 42. Therefore, the insertion direction of the valve 25 to the base portion 42 and the mounting direction of the large diameter part 44 are the same. The snap-fit mechanism 61 and 62 has a vertical engaging surface to prevent the valve 25 from being disconnected in a reverse direction to the insertion direction of the valve 25. The snap-fit mechanism 55 and 56 has a vertical engaging surface to prevent the large diameter part 44 from being disconnected in a reverse direction to the mounting direction of the large diameter part 44. The snap-fit mechanism 55 and 56 and the snap-fit mechanism 61 and 62 are formed so that the engaging surfaces are distanced each other in the axial direction and are arranged on the same line in the axial direction. Such arrangement makes it possible to arrange another snap-fit mechanism 61 and 62 within one large engaging window 56.

In this embodiment, the hook parts 55 and 61 and the engaging windows 56 and 62 which provide the snap-fit mechanisms can be formed by a slide molding die which is movable in the radial direction. In particular, the hook part 55 and the engaging window 62 can be formed by a slide molding die which is movable in the radial direction of the base portion 42. Since the hook part 55 and the engaging window 62 are projected or penetrated along the same one radial direction of the base portion 42, it is possible to form them by a common slide molding die.

Figure 4:
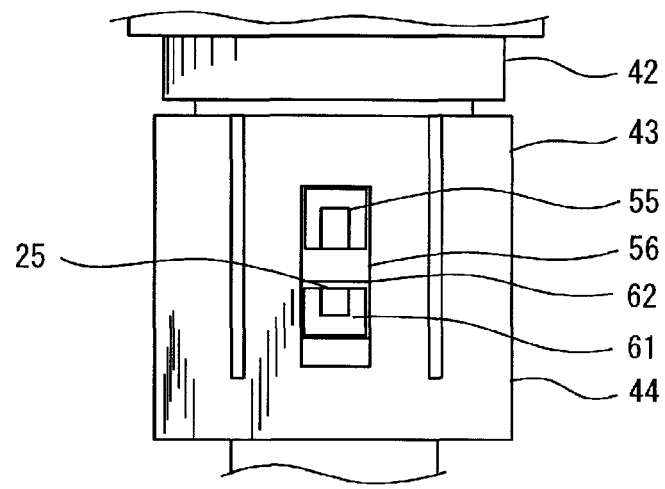
FIG. 4 is a side view of the component container according to the first embodiment.

FIG. 4 is a side view showing a condition in which the valve 25 is contained in the component container. As shown in the drawing, the engaging window 62 is located within the engaging window 56. In addition, the hook part 61 of the valve 25, which is engaged with the engaging window 62, is located within the engaging window 56. According to this embodiment, not only the hook part 55 but the hook part 61 is also positioned within the engaging window 56. The hook part 61 is arranged to be exposed to an outside of the large diameter part 44. Thereby, the valve 25 contained in the base portion 42 can be directly detectable from an outside of the large diameter part 44.

Figure 5:
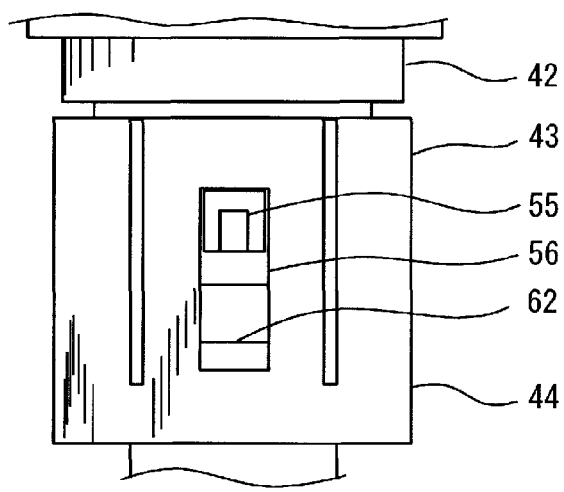
FIG. 5 is a side view of the component container according to the first embodiment.

FIG. 5 is a side view showing a condition in which the valve 25 is not contained in the component container. When the valve 25 is not contained in the base portion 42, the valve 25 does not appear in the engaging window 56. Especially, it is impossible to find the hook part 61 which has a three-dimensional characteristic configuration within the engaging window 56. Therefore, it is certainly detectable that there is no valve 25. The hook part 61 may be detectable by using a visual-sense apparatus and electronic picture processing in a manufacturing method of the fuel supply device. Alternatively, the hook part 61 may be detectable by a visual check of an operator.

Other Embodiments

The present disclosure is not limited to the above embodiments, and the present disclosure may be practiced in various modified embodiments. The present disclosure is not limited to the above combination, and disclosed technical means can be practiced independently or in various combinations. Each embodiment can have an additional part. The part of each embodiment may be omitted. Part of embodiment may be replaced or combined with the part of the other embodiment. The configurations, functions, and advantages of the above-mentioned embodiments are just examples. The technical scope of disclosure is not limited to the embodiment. Some extent of the disclosure may be shown by the scope of claim, and also includes the changes, which is equal to and within the same range of the scope of claim.

For example, the resin material which forms the base portion 42 and the large diameter part 44, and the resin material which forms the case of the valve 25 may have different colors. It is possible to make the hook part 61 in the engaging window 56 noticeable.

The hook part 61 is directly formed on the valve 25 in the preceding embodiments. Alternatively, the hook part 61 may be formed on a valve retainer which is arranged within the component container with the valve 25. In this case, the retainer may be regarded as a component belonging to the valve 25.

In the preceding embodiments, the valve 25 is inspected by using the engaging window 56 of the snap-fit mechanism. The other one of in-tank components may be inspected instead of the valve 25. For example, a fuel filter or a fuel feed pump may be arranged within the component container, and those components may be inspected via the engaging window 56, instead of the valve 25.

The support pillars 41 and 241 may be formed by combining much more members. For example, the base portion 42 may be provided by a cylindrical member which is separable from the cap 31. The intermediate portions 43 and 243 may be provided by a plurality of cylindrical members.

The support pillars 41 and 241 may support an auxiliary pump 20. In addition, the second module 21 containing the support pillars 41 and 241 may support a sub-tank for collecting fuel in the second section 14. In this case, the support pillar may be formed as a thick cylindrical column which may have almost the same diameter as the cap 31.

What is claimed is:

1. A fuel supply device comprising:
    a cylindrical base portion which is disposed in a fuel tank, and defines a component container for containing a component;
    a large diameter part connected to an outside of the base portion;
    an inside snap-fit mechanism which connects the component and the base portion by an engagement of a first engaging window disposed on the base portion and a first hook part disposed on the component; and
    an outside snap-fit mechanism which connects the base portion and the large diameter part by an engagement of a second engaging window and a second hook part, the second engaging window being disposed by penetrating the large diameter part located on a radial outside of the inside snap-fit mechanism in a radial direction, and the second hook part being disposed on the outside of the base portion.

2. The fuel supply device in claim 1, wherein
    the second hook part disposed on the base portion and the first engaging window disposed on the base portion are arranged along an axial direction on the base portion.

3. The fuel supply device in claim 2, wherein
    The first engaging window disposed on the base portion is disposed closer to an open end of the base portion than the second hook part disposed on the base portion.

4. The fuel supply device in claim 1, wherein
    the second engaging window disposed on the large diameter part is an aperture which has a width capable of receiving the second hook part disposed on the base portion, and which is long and narrow along an axial direction and spreads over an area extended from the second hook part disposed on the base portion to at least a part of the first engaging window disposed on the base portion.

5. The fuel supply device in claim 4, wherein
    the second engaging window disposed on the large diameter part spreads over both the second hook part disposed on the base portion and the first engaging window disposed on the base portion.

6. The fuel supply device in claim 1, wherein
    the second hook part disposed on the base portion, the first engaging window disposed on the base portion, and the first hook part disposed on the component are located within the second engaging window disposed on the large diameter part in a visible manner.

7. The fuel supply device in claim 1, wherein
    the component is relevant to ventilation of the fuel tank.

8. The fuel supply device in claim 7, wherein
    the component is a valve which is a part of an evaporated fuel emission control system.

* * * * *